United States Patent
Swinderman

(10) Patent No.: US 8,006,830 B2
(45) Date of Patent: Aug. 30, 2011

(54) EXTERIORLY MOUNTED WEAR LINER FOR BULK MATERIAL CONVEYOR BELT SYSTEMS

(75) Inventor: Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 124 days.

(21) Appl. No.: 12/234,384

(22) Filed: Sep. 19, 2008

(65) Prior Publication Data

US 2010/0072034 A1    Mar. 25, 2010

(51) Int. Cl.
*B65G 21/20* (2006.01)

(52) U.S. Cl. ................................ 198/836.1

(58) Field of Classification Search ........... 198/836.1, 198/836.3
See application file for complete search history.

(56) References Cited

U.S. PATENT DOCUMENTS

| | | | |
|---|---|---|---|
| 3,024,893 A * | 3/1962 | Lambert | 198/836.1 |
| 3,651,910 A | 3/1972 | Buschbom | |
| 4,204,595 A * | 5/1980 | Marrs | 198/836.1 |
| 4,896,435 A | 1/1990 | Spangler, Jr. | |
| 5,016,747 A | 5/1991 | Veenhof | |
| 5,048,669 A * | 9/1991 | Swinderman | 198/525 |
| 5,184,706 A | 2/1993 | Christenson | |
| 5,244,069 A | 9/1993 | Cosgrove | |
| 5,303,813 A * | 4/1994 | de Rooy | 198/525 |
| 5,513,743 A * | 5/1996 | Brink | 198/836.1 |
| 6,041,906 A | 3/2000 | Howard | |
| 6,279,715 B1 | 8/2001 | Herren | |
| 6,547,062 B2 * | 4/2003 | Wiggins | 198/836.1 |
| 6,684,999 B1 | 2/2004 | Howard | |
| 6,763,935 B2 | 7/2004 | Ostman | |
| 2004/0031666 A1 * | 2/2004 | Ostman | 198/836.1 |
| 2004/0182673 A1 | 9/2004 | Baller | |
| 2008/0053785 A1 | 3/2008 | Neville et al. | |
| 2009/0020391 A1 | 1/2009 | McKeough | |

FOREIGN PATENT DOCUMENTS

| | | |
|---|---|---|
| DE | 2418458 A1 | 10/1975 |
| GB | 933810 A | 8/1963 |
| JP | 8-258941 A | 10/1996 |
| JP | 2000-72220 A | 3/2000 |
| WO | 2007/053883 A1 | 5/2007 |

OTHER PUBLICATIONS

Ex-Access Pivotable Conveyor Containment System; http://www.nelsonwilliams.com/ezaccess.html, admitted prior art, 3 pages.
PUR Equipamentos Indstriais Ltda., http://www.pur.ind.br/produtos.html, admitted prior art, 1 page.
Unpublished English translation of DE 2418458 generated by Nelles Translations in Jan. 2011, 7 pages.
Unpublished English translation of JP 2000-72220 generated by Nelles Translations in Jan. 2011, 6 pages.
Unpublished English translation of JP 8-258941 generated by Nelles Translations in Jan. 2011, 8 pages.

* cited by examiner

*Primary Examiner* — Mark A Deuble
(74) *Attorney, Agent, or Firm* — Thompson Coburn LLP; Clyde L. Smith

(57) ABSTRACT

A bulk material conveyor belt system comprises a belt, a skirt, and a wear liner. The belt forms a continuous loop having an upper transfer run and a lower return run. The belt defines a theoretical, vertically oriented, center plane about which the belt is generally symmetric. The skirt has a lower edge that extends above the transfer run. The wear liner is removably attached to the skirt in a manner such that the skirt lies between the wear liner and the center plane. The wear liner has a lower edge that that extends above the transfer run and beneath the lower edge of the skirt.

13 Claims, 3 Drawing Sheets

EXTERIORLY MOUNTED WEAR LINER FOR BULK MATERIAL CONVEYOR BELT SYSTEMS

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to bulk material belt conveyor systems. More specifically, this invention pertains to wear liners that are mounted to skirts to prevent the spillage of bulk material from conveyor belt systems and prevent the bulk material from abrading the skirts.

2. General Background Technology

All bulk material belt conveyor systems comprise a belt that extends in a continuous loop around rollers. The upper portion of the continuous loop can be referred to as a transfer run and the lower portion of the continuous loop can be referred to as a return run. Bulk material is loaded onto the belt at one or more loading zones along the transfer run. At a loading zone, it is common to provide a chute that directs bulk material onto the belt. To maximize the efficiency of conveyor belts systems, it is also common to heap the bulk material near the centerline of the belt, while keeping such bulk material from spilling off of the belt. To prevent such spillage, most chutes comprise rigid skirts that extend downward toward the belt for purposes of redirecting stray bulk material and maintaining such material on the belt. The skirts often continue for some distance downstream of the chute to provide time for the bulk material to come to rest relative to the belt. Skirts may also be provided along other portions of the transfer run to reposition bulk material that has migrated toward the sides of the belt. Because many types of bulk materials are abrasive, it is also common practice to attach wear liners to the skirts, which prevent the skirts from direct contact with the bulk material. In contrast, the wear liners do wear from direct contact with the moving bulk material and periodically must be replaced. However, such wear is expected. In addition to replacement, it is also often desirable to be able to periodically adjust the position of the lower edge of the wear liners relative to the skirt and belt. By doing so, a desired gap between the wear liners and the belt can be generally maintained. The positioning of the wear liner is critical to controlling spillage and incorrect or inadequate mounting can cause severe damage to the belt.

It is common practice to mount the wear liners on face of the skirt that faces the centerline or center plane of the belt. Since the cross section of the belt is often trough-shaped, it is also common for the lower edge of a wear liner to be positioned lower than the lower edge of skirt so as to reduce the gap between the lower edge of the wear liner and the belt. Still further, belt seals are often attached to the side of the skirt that faces away from the center plane of the belt. Such belt seals engage the belt and prevent dust and fine bulk material from spilling off of the belt.

Due to the fact that wear liners are mounted to the side of the skirt facing the center plane of the belt (the inward side), it is often necessary for a worker to climb into a chute or onto the belt to replace worn wear liners. Following confined space procedures and working in very difficult conditions make it difficult to accurately position the wear liners. However, others have developed apparatus and methods that allow such wear liners to be replaced from the opposite side of a skirt (the outward facing side). For example, Nelson Williams Linings, Inc. manufactures a skirt that has portion that can be pivoted in a manner that allows a portion of the inward facing side of the skirt to be tilted to the point wear it faces upwards. This allows wear liners attached to the pivoting portion to be replaced from the outward side of the skirt and is describe in U.S. Pat. No. 6,763,935. However, such techniques create new safety issues, make it difficult to seal between sections of wear liners, make inspection of the mounting with the belt loaded impossible, and impact the structure of the skirts, which must bare the loads associated with diverting the bulk material.

SUMMARY OF THE INVENTION

The present invention provides for an apparatus a method for attaching wear liners to the outward side of a skirt without subjecting the skirt to abrasion wear and without complicating the skirt structure. As a result, the wear liners can be inspected, replaced, or repositioned without accessing the inward side of the skirt. Thus the invention makes the installation and adjustment of wear liners safer and more accurate.

In one aspect of the invention, a bulk material conveyor belt system comprises a belt, a skirt, and a wear liner. The belt forms a continuous loop having an upper transfer run and a lower return run. The belt defines a theoretical, vertically oriented, center plane about which the belt is generally symmetric. The skirt has a lower edge that extends above the transfer run. The wear liner is removably attached to the skirt in a manner such that the skirt lies between the wear liner and the center plane. The wear liner has a lower edge that that extends above the transfer run and beneath the lower edge of the skirt.

Another aspect of the invention pertains to a method comprising a step of accessing a bulk material conveyor belt system. The bulk material conveyor belt system comprises a belt, a skirt, and a worn wear liner. The belt forms a continuous loop having an upper transfer run and a lower return run. The belt defines a theoretical, vertically oriented, center plane about which the belt is generally symmetric. The skirt has a lower edge that extends above the transfer run. The worn wear liner is removably attached to the skirt in a manner such that the skirt lies between the worn wear liner and the center plane. The worn wear liner has a lower edge that that extends above the transfer run and beneath the lower edge of the skirt. The method further comprises a step of detaching the worn wear liner from the bulk material conveyor belt system. The detaching is performed by a person while the skirt lies between the person and the center plane. Still further, the method comprises a step of attaching a replacement wear liner to the bulk material conveyor belt system. The replacement wear liner has a lower edge. The attaching step is performed by a person while the skirt lies between the person and the center plane and in manner such that the lower edge of the replacement wear liner extends above the transfer run and beneath the lower edge of the skirt.

In yet another aspect of the invention, a method comprises a step of accessing a bulk material conveyor belt system. The bulk material conveyor belt system comprises a belt, a skirt, and a wear liner. The belt forms a continuous loop having an upper transfer run and a lower return run. The belt defines a theoretical, vertically oriented, center plane about which the belt is generally symmetric. The skirt has a lower edge that extends above the transfer run. The wear liner is removably attached to the skirt via at least one threaded fastener in a manner such that the skirt lies between the wear liner and the center plane. The wear liner has a lower edge that that extends above the transfer run and beneath the lower edge of the skirt. The method further comprises a step of moving the lower edge of the wear liner downward relative to the belt by rotating the fastener.

Further features and advantages of the present invention, as well as the operation of various embodiments of the present invention, are described in detail below with reference to the accompanying drawings.

Figure 1:
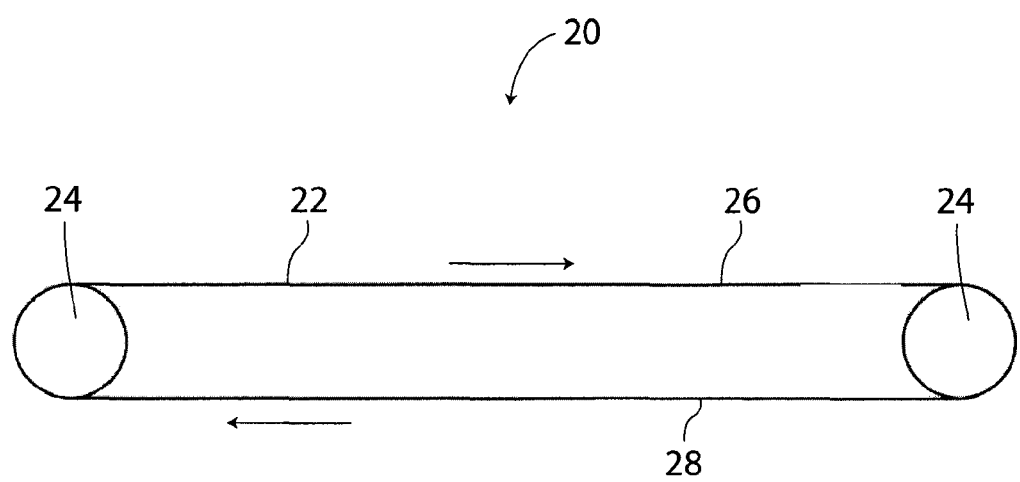
FIG. 1 is a schematic representation of a bulk material conveyor belt system.

Reference numerals in the written specification and in the drawing figures indicate corresponding items.

DETAILED DESCRIPTION OF THE INVENTION

A bulk material conveyor belt system is shown schematically in FIG. 1. The bulk material conveyor belt system 20 comprises a belt 22 that is driven about rollers 24 and forms a continuous loop. The upper portion of the continuous loop is referred to herein as the transfer run 26 and the lower portion of the continuous loop is referred to herein as the return run 28. Preferably, the belt 22 has a trough-like shape (not shown) as it passes along the transfer run 26, but may also be flat. The belt may also have a flat or inverted trough-like shape along the return run 28.

Figure 2:
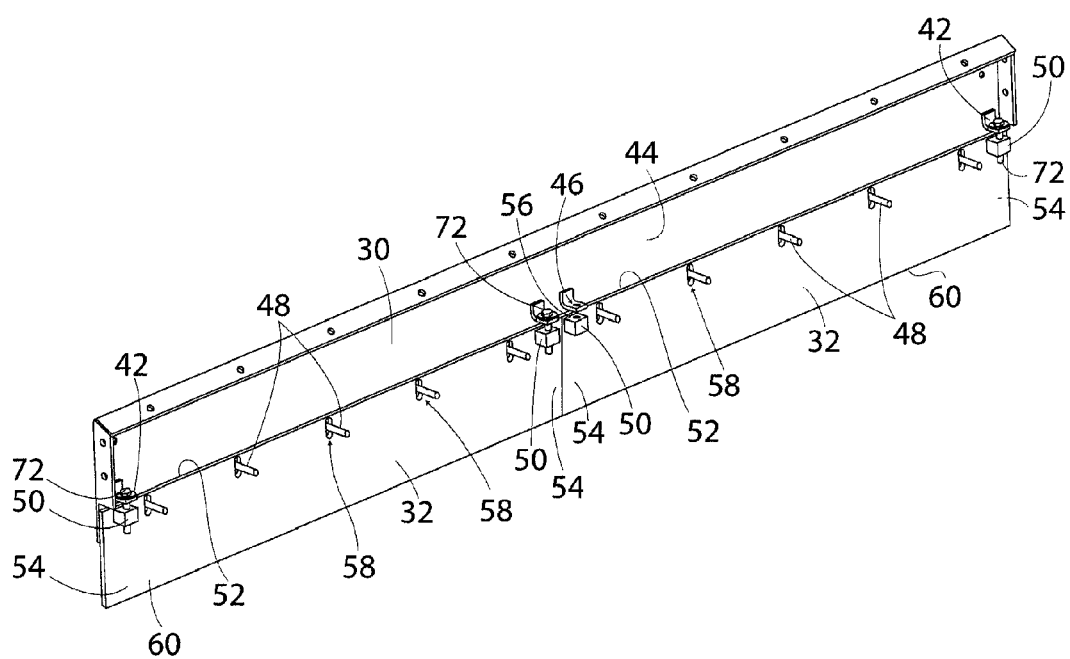
FIG. 2 is a perspective view of portion of a skirt of a bulk material conveyor belt system having a wear liner attached thereto in accordance with the invention.
Figure 3:
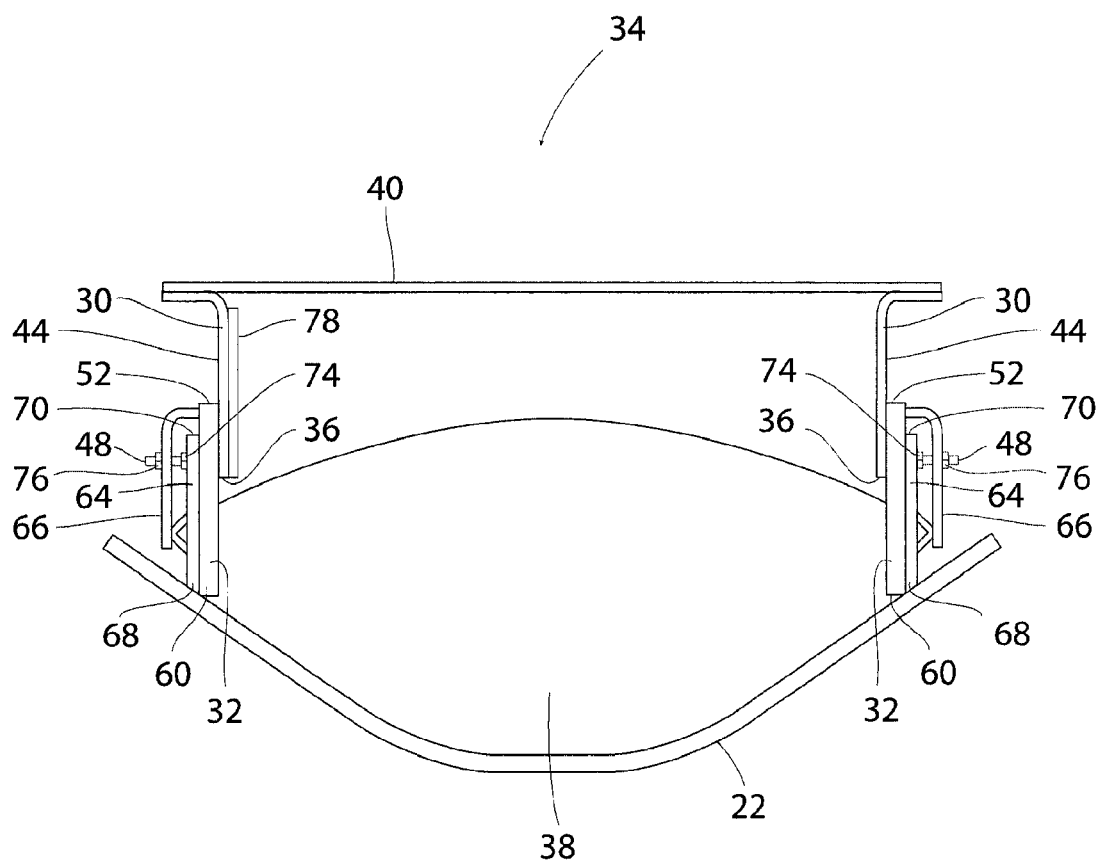
FIG. 3 is an elevation view of a cross-section of a bulk material conveyor belt system in accordance with the invention, as viewed looking along the runs of the conveyor belt.

FIGS. 2 and 3 depict a skirt 30 and wear liner 32 assembly. FIG. 3 depicts a cross-section of the settling region of the loading zone of a conveyor belt system 34. Preferably a skirt 30 is positioned on each opposite side of the center plane near each of the edges of the belt 22. Each skirt 30 extends downward and preferably has a lower edge 36 that is positioned above the belt 22 by an amount that is greater than the anticipated height of the bulk material 38 at that location. This prevents the bulk material 38 from abrading the skirts 30. The conveyor belt system 34 may also comprise a cover 40 connecting the top of the skirts 30 to prevent dust from escaping. The skirts 30 are preferably formed steel and may be supported by the frame (not shown) of the conveyor belt system 34, which also supports the components that support the belt 22. As shown in FIG. 2, brackets 42 are preferably welded along the outer surface 44 of each skirt 30 adjacent the lower edge 36 of the skirt. Each bracket 42 protrudes from the outer surface 44 of the skirt 30 and comprises a vertically oriented through hole 46. Additionally, a plurality of threaded studs 48 protrude outward from the outer surface 44 of the skirt 30.

The wear liner 32 may be formed of any material. Common materials include, abrasion resistant steel, steel faced with rubber, polyurethane, or ceramic tiles, weld deposited hard facing, cast basalt cement or cast molybdenum alloy segments. As shown in FIG. 2, each wear liner 32 preferably comprises a plurality of protruding bosses 50 adjacent the upper edge 52 of the wear liner and adjacent each of the opposite ends 54 of the wear liner, each of which comprises a vertically oriented threaded hole 56. Each wear liner 32 also preferably comprises a plurality of elongate openings 58 adjacent the upper edge 52 and between the bosses 50. The lower edge 60 of the wear liner is preferably parallel to the upper edge 52.

As shown in FIG. 3, the conveyor belt system 34 also preferably comprises a plurality of seals 64 and sealing clamps 66. The seals 64 may be made of rubber, polyurethane or other similar materials. Each seal 64 is generally rectangular and comprises a beveled lower edge 68. Each seal 64 also preferably comprises elongate openings (not shown) adjacent its upper edge 70, which are similar to those of the wear liners 32. The seal clamps 66 are preferably formed of steel strip and have a cross-section as shown in FIG. 3. Each seal clamp 66 comprises at least one through hole (not shown). The seal clamps are typically joined near the belt with an angle iron in a manner forming a substantially continuous clamping lip.

The above-described components are preferably assembled by first placing the wear liner 32 against the outer surface 44 of the skirt 30 with the studs 48 of the skirt extending through the openings 58 of the wear liner. A threaded bolt or screw 72 is then inserted through the through hole 46 of one of the brackets 42 of the skirt 30 and is threadably engaged with the threaded hole 56 of one of the bosses 50 of the wear liner 32. Another threaded bolt or screw 72 is also inserted through the through hole 46 of one of the brackets 42 of the skirt 30 and is threadably engaged with the threaded hole 56 of another one of the bosses 50 of the wear liner 32. It should be appreciated the purpose of these threaded fasteners 72 is not to clamp the wear liner 32 to the skirt 30, but rather is to suspend the wear liner above the belt 22 from the skirt. By rotating the threaded fasteners 72, the opposite ends 54 of the wear liner 32 can be independently raised and lowered relative to the belt 22. This is done to achieve a desired clearance between the wear liner 32 and the belt 22 along the lower edge 60 of the wear liner. After achieving this, the seal 64 is positioned against the wear liner 32, with the wear liner between the seal and the skirt 30 and the beveled lower edge 68 of the seal in contact with the belt 22. A nut and washer 74 can then be threadably attached to each of the studs 48 passing through the wear liner 32 and tightened against the seal 66 to clamp the seal against the wear liner and to clamp the wear liner against the skirt 30. Alternatively, the nuts and washers 74 can be threadably attached to the studs 48 prior to placing the seal 64 against the wear liner 32, where they can directly clamp the wear liner against the skirt 30, provided the openings of the seal are larger than the nuts and washers or the upper edge of the seal lies beneath the studs. Either way, with the seal 66 in place, each seal clamp 66 is then positioned such that the studs 48 extend through their respective through hole(s). It should be appreciated that not all studs 48 necessarily pass through a seal clamp 66. Another set of nuts and washers 76 can then be threadably attached to the respective studs 48 to thereby clamp the sealing clamps 66 against the seal 64, and thus the seal against the wear liner 32. Additionally it is common practice to tack weld liners in place to prevent accidental falling of the liner into the belt. If the elongate slots are closed and of proper dimensions the wear liner of this invention cannot fall far enough to contact the belt. If tack welding is desired it can be done from the outside of the enclosed skirt in contrast to conventional constructions. Additionally it is common practice to install wear liners in a self relieving fashion so that the distance of the wear liner from the belt increases uniformly but slightly in the direction of belt travel to prevent materials from being trapped between the belt and the wear liner and the belt. Such a self relieving pattern is much easier to accomplish with the current invention. After completing this, the conveyor belt system 34 can be operated.

When wear liners 32 become worn to the point of needing replacement, the above-described procedures can be reversed to remove each worn wear liner. Replacement wear liners 32 can then be attached by repeating the above-described procedures. Additionally, if the gaps between the lower edges 60 of the wear liners 32 and the belt 22 become larger than desired, due for example to wear or thermal expansion, the nuts 74 clamping the wear liner against the skirt can be loosened and the threaded fasteners 72 can be used as described above to adjust the gaps, after which the nuts can be retightened. Preferably the wear liners are uniformly dimensioned so that their position can be interchanged with each other to even out the wearing and prolong the useful life of the wear liners In view of the foregoing, it should be appreciated that the invention achieves the several advantages over prior art methods and devices. For example, the wear liners can be repositioned or replace without requiring a person to climb onto the belt or otherwise access the inner surface of the skirt. Additionally, the present invention does not complicate the structure of the skirts. It should be appreciated however that the present invention can still incorporate additional wear liners (such as indicated by the reference numeral 78 in FIG. 3) that are attached to the inner surface of the skirts.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A bulk material conveyor belt system comprising:
   a belt, the belt forming a continuous loop having an upper transfer run and a lower return run, the belt defining a vertically oriented center plane about which the belt is generally symmetric;
   a skirt, the skirt having a lower edge that extends above the transfer run,
   a wear liner, the wear liner comprising a plurality of openings and being removably attached to the skirt in a manner such that the skirt lies between the wear liner and the center plane, the wear liner having a lower edge that that extends above the transfer run and beneath the lower edge of the skirt,
   a seal, the seal being engaged with and clamped against the wear liner, the wear liner extending between the seal and the skirt;
   at least two threaded fasteners that removably attach the wear liner to the skirt in a manner such that the lower edge of the wear liner can be raised and lowered relative to the belt by rotating the fasteners.

2. A bulk material conveyor belt system in accordance with claim 1 wherein the lower edge of the wear liner has opposite end margins and the end margins can be raised and lowered relative to each other by rotating the fasteners.

3. A bulk material conveyor belt system in accordance with claim 1 wherein the wear liner comprises a plurality of elongated openings, the skirt comprises a plurality of threaded studs, the studs extend through the elongated openings of the wear liner, the bulk material conveyor belt system comprises a plurality of threaded nuts, and the nuts are threadably attached to the studs in a manner clamping the wear liner against the skirt.

4. A bulk material conveyor belt system in accordance with claim 3 wherein the nuts constitute first nuts, the bulk material conveyor belt system comprises at least one seal clamp and at least one threaded second nut, the second nut is threadably attached to one of the studs in a manner clamping the seal clamp against the seal, and the seal is at least partially clamped against the skirt by the seal clamp.

5. A bulk material conveyor belt system in accordance with claim 4 wherein the seal is also at least partially clamped against the skirt by the first nuts.

6. A method comprising:
   accessing a bulk material conveyor belt system, the bulk material conveyor belt system comprising a belt, a skirt, and a worn wear liner, the belt forming a continuous loop having an upper transfer run and a lower return run, the belt defining a vertically oriented center plane about which the belt is generally symmetric, the skirt having a lower edge that extends above the transfer run, the worn wear liner is removably attached to the skirt in a manner such that the skirt lies between the worn wear liner and the center plane, the worn wear liner has a lower edge that extends above the transfer run and beneath the lower edge of the skirt;
   detaching the worn wear liner from the bulk material conveyor belt system, the detaching being performed by a person while the skirt lies between the person and the center plane;
   attaching a replacement wear liner to the bulk material conveyor belt system via at least two threaded fasteners, the replacement wear liner having a lower edge, the attaching being performed by a person while the skirt lies between the person and the center plane and in manner such that the lower edge of the replacement wear liner extends above the transfer run and beneath the lower edge of the skirt, the attaching also comprising moving the lower edge of the replacement wear liner relative to the belt by rotating the fasteners; and
   attaching a seal to the conveyor belt system in a manner such that the seal is engaged with and clamped against the replacement wear liner and the replacement wear liner extends between the seal and the skirt.

7. A method in accordance with claim 6 wherein the step of moving the lower edge of the replacement wear liner is performed by a person while the skirt lies between the person and the center plane.

8. A method in accordance with claim 7 wherein the person that performs the step of detaching the worn wear liner from the bulk material conveyor belt system is the same person that performs the step of attaching a replacement wear liner to the bulk material conveyor belt system and is the same person that performs the step of attaching a seal to the conveyor belt system and is the same person that performs the step of moving the lower edge of the replacement wear liner.

9. A method in accordance with claim 6 wherein the replacement wear liner comprises a plurality of elongated openings and the skirt comprises a plurality of threaded studs, and the step of attaching the replacement wear liner to the bulk material conveyor belt system comprises extending the studs through the elongated openings of the replacement wear liner and using a plurality of nuts to threadably clamp the wear liner against the skirt by threadably attaching the nuts to the studs.

10. A method comprising:
accessing a bulk material conveyor belt system, the bulk material conveyor belt system comprising a belt, a skirt, a seal, and a wear liner, the belt forming a continuous loop having an upper transfer run and a lower return run, the belt defining a vertically oriented center plane about which the belt is generally symmetric, the skirt having a lower edge that extends above the transfer run, the wear liner is removably attached to the skirt via at least one threaded fastener in a manner such that the skirt lies between the wear liner and the center plane, the wear liner having a lower edge that extends above the transfer run and beneath the lower edge of the skirt;
moving the lower edge of the wear liner downward relative to the belt by rotating the fastener; and
clamping the seal against the wear liner with the wear liner engaging both the seal and the skirt and extending between the seal and the skirt.

11. A method in accordance with claim 10 wherein the step of moving the lower edge of the wear liner is perform by a person while the skirt lies between the person and the center plane.

12. A method in accordance with claim 11 wherein the bulk material conveyor belt system comprises a plurality of threaded nuts, the wear liner comprises a plurality of elongated openings, the skirt comprises a plurality of threaded studs that extend through the openings of the wear liner, the nuts are threadably attached to the studs in a manner such that the wear liner and the seal extend between the nuts and the skirt, and wherein the method further comprises rotating the nuts in a manner such that the nuts clamp the seal against the wear liner and the wear liner against the skirt.

13. A method in accordance with claim 12 wherein the studs move within the openings of the wear liner during the step of moving the lower edge of the wear liner downward.

* * * * *